Sept. 24, 1968
R. M. GUNTERT
3,402,649
DISTRIBUTING BOX FOR ROAD-BUILDING MACHINE
Filed Dec. 19, 1966
5 Sheets-Sheet 1
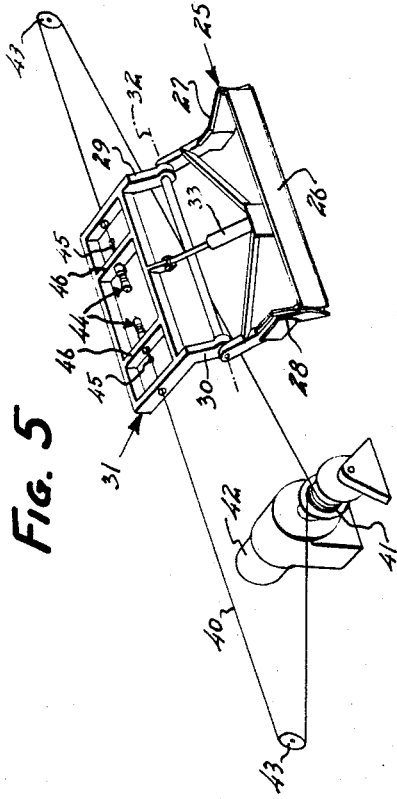
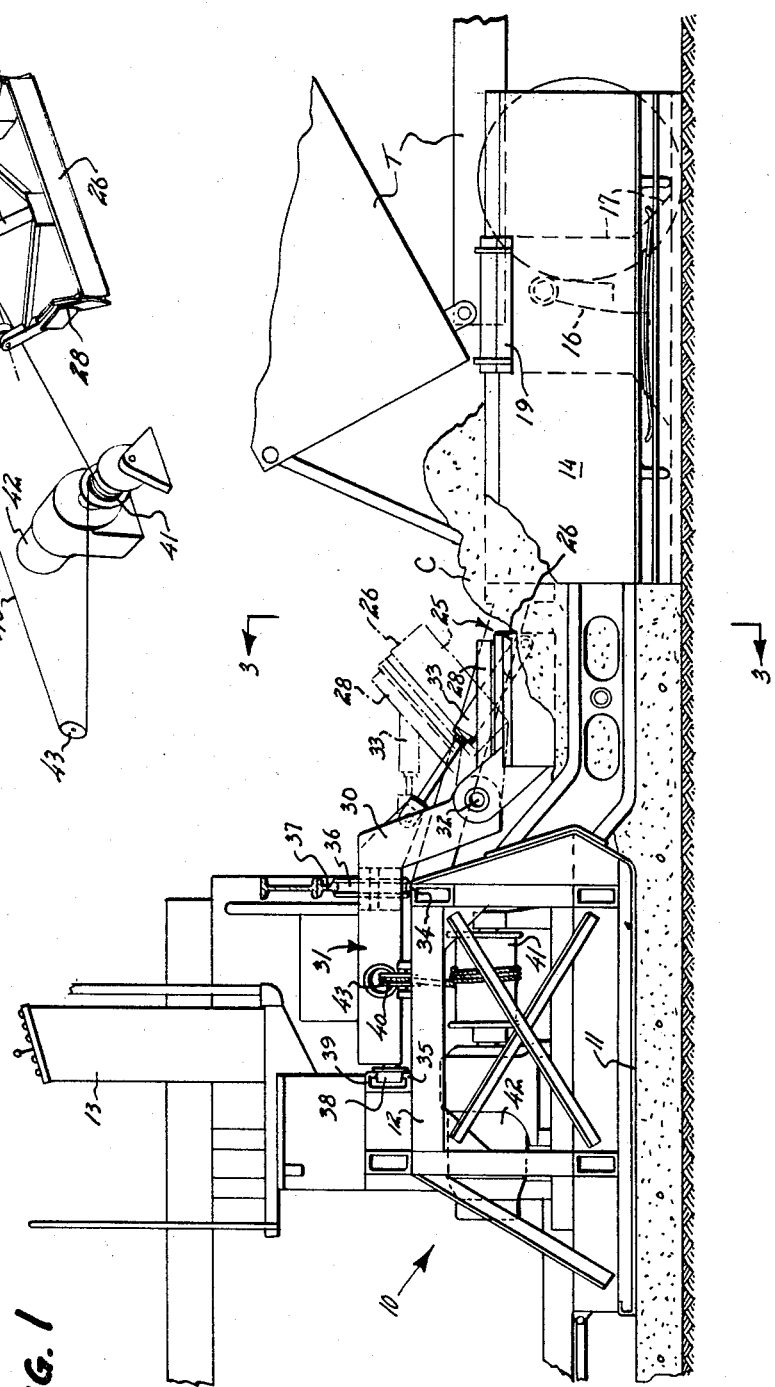
INVENTOR.
RONALD M. GUNTERT
BY
Mellin and Hanscom
ATTORNEYS Sept. 24, 1968　　　　　R. M. GUNTERT　　　　　3,402,649
DISTRIBUTING BOX FOR ROAD-BUILDING MACHINE
Filed Dec. 19, 1966　　　　　　　　　　　　　5 Sheets-Sheet 2
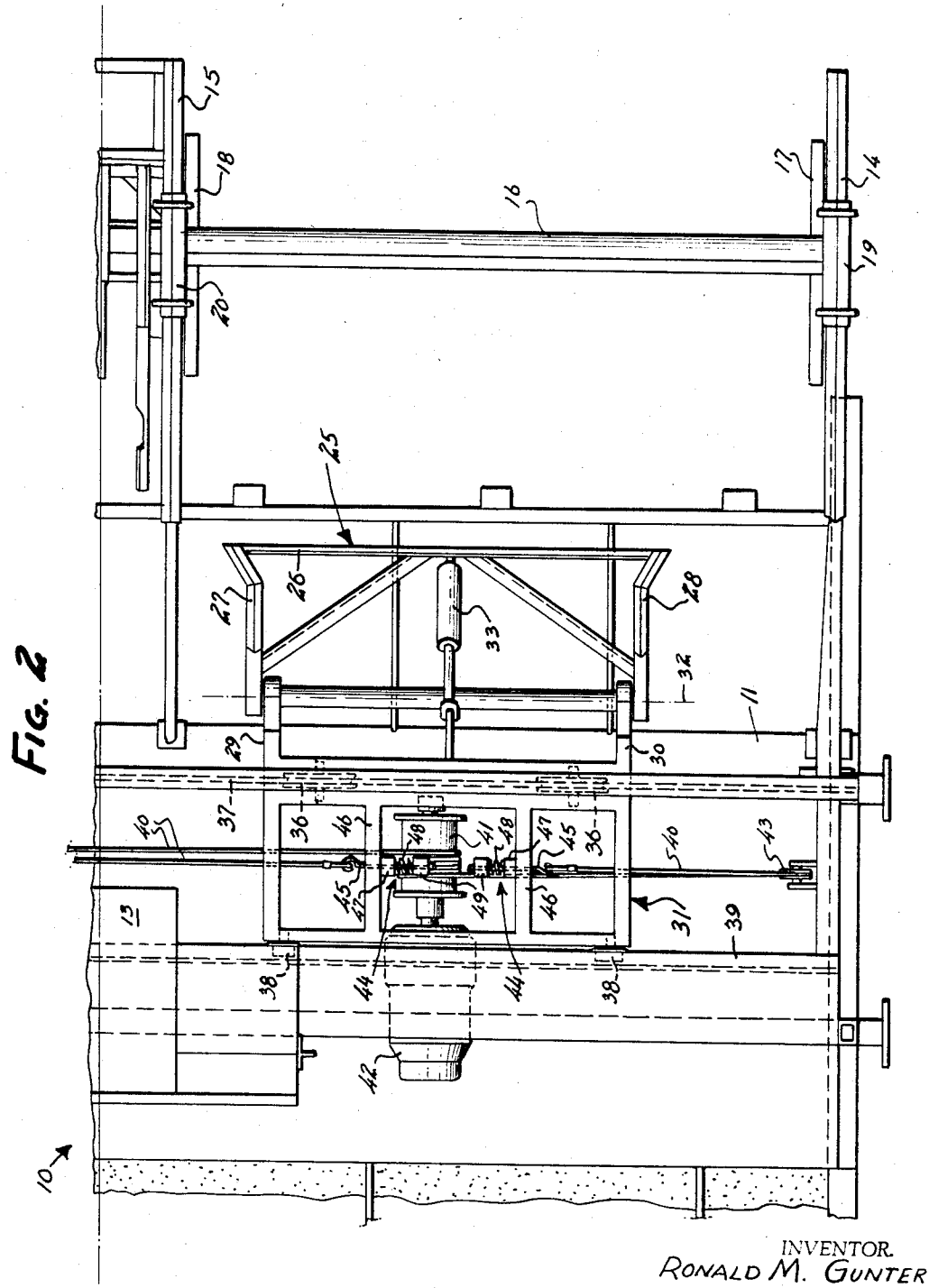
INVENTOR.
RONALD M. GUNTERT
BY
Mellin and Hanscom
ATTORNEYS

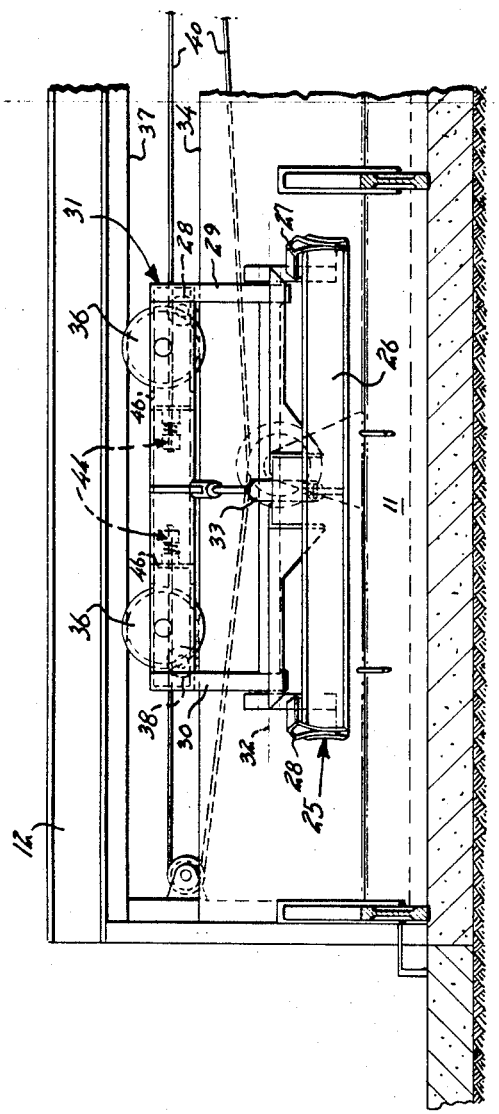

Sept. 24, 1968  R. M. GUNTERT  3,402,649
DISTRIBUTING BOX FOR ROAD-BUILDING MACHINE
Filed Dec. 19, 1966  5 Sheets-Sheet 4
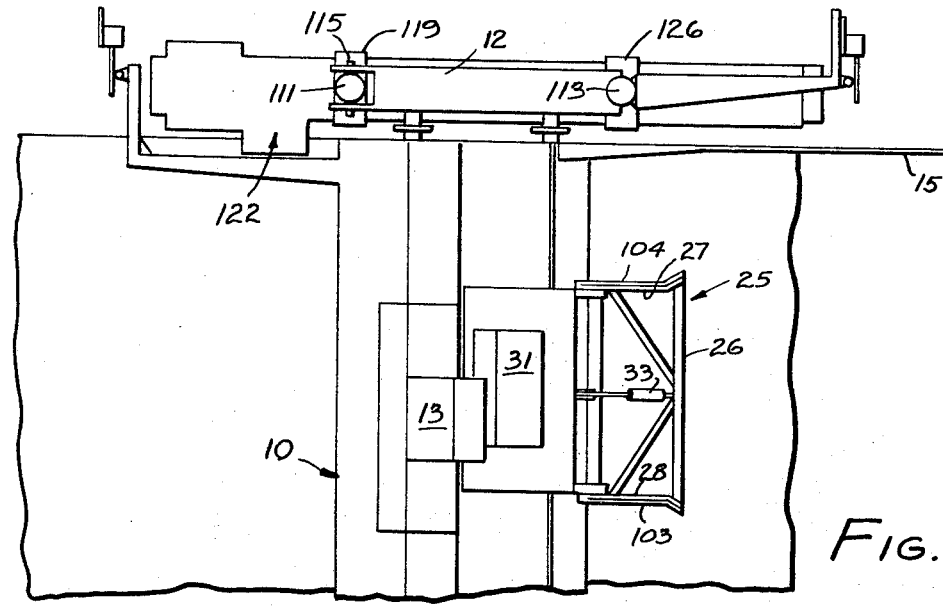
FIG. 7
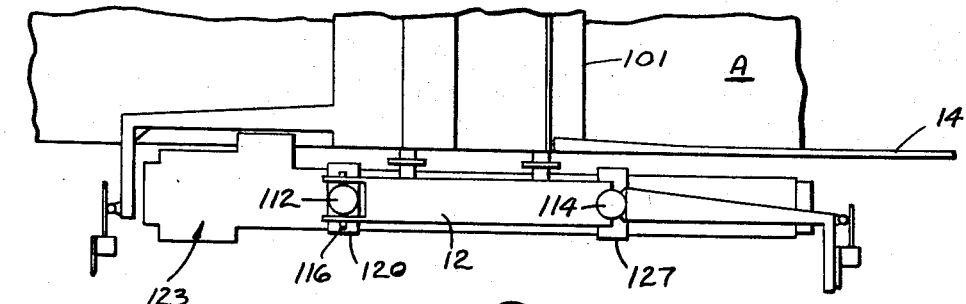
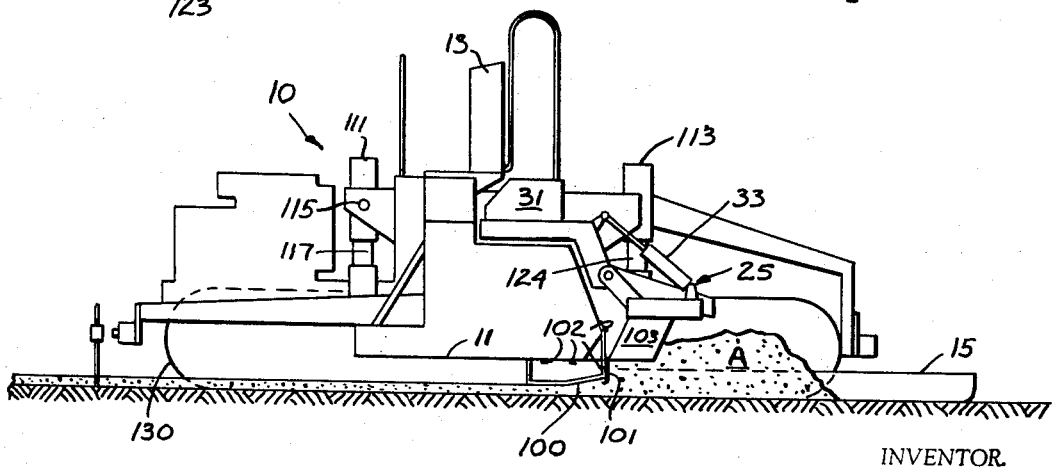
FIG. 6
INVENTOR.
RONALD M. GUNTERT
BY
Mellin, Moore + Weissenberger
ATTORNEYS Sept. 24, 1968

R. M. GUNTERT 3,402,649

DISTRIBUTING BOX FOR ROAD-BUILDING MACHINE

Filed Dec. 19, 1966

INVENTOR.
RONALD M. GUNTERT
BY
Mellin, Moore + Weissenberger
ATTORNEYS

United States Patent Office 3,402,649
Patented Sept. 24, 1968

3,402,649
DISTRIBUTING BOX FOR ROAD-BUILDING MACHINE
Ronald M. Guntert, Stockton, Calif., assignor to Guntert & Zimmerman Const. Div., Inc., Stockton, Calif., a corporation of California
Continuation-in-part of application Ser. No. 519,821, Dec. 15, 1965. This application Dec. 19, 1966, Ser. No. 611,512
7 Claims. (Cl. 94—46)

ABSTRACT OF THE DISCLOSURE

A road-building machine having a spreader car which may be moved transversely of the machine by a winch-operated cable, the framework of the spreader being also pivotally mounted on a horizontal axis from the spreader car and movable about that pivot by a fluid cylinder.

Cross reference to related application

This invention is a continuation-in-part of my copending application entitled, Distributing Box for Road-Building Machine, Ser. No. 519,821, filed Dec. 15, 1965, and now abandoned.

Background of the invention

This invention relates to road-building apparatus and, more particularly, to a distributing box for framework for transporting and spreading material, such as a cementitious or asphalt mixture, that has been disposed in front of a traveling road-building machine.

It will be understood, of course, that various means have previously been used to deposit and spread material across and in front of an approaching road-building machine. These conventional means may consist of a hopper which is periodically filled with a quantity of material. Such hoppers are mounted on a carriage for movement transversely of the machine to particular areas where the material that it carries is released. It is also common to employ reciprocated spreader blades which are disposed in front of the road-building machine for spreading and distributing the material dumped from a hopper.

Summary of the invention

The present invention comprises a novel form of open-bottom framework pivotally mounted from a movable spreader car. The framework functions both as a carrier of material and as a spreader. Since the framework can be vertically moved relative to its spreader car, it may be made to confine large volumes of material and transport that material transversely of the machine in either direction. More particularly, the embodiment of the invention shown in the drawings, and herein described, is pivotally hinged so that it can be raised up and positioned over a large volume of material. The framework is then lowered to confine the material; and while in its lower position, the framework and spreader car are moved transversely of the road-building machine, thereby transporting the material while also spreading the material over the subjacent roadbed.

Therefore, it is to be understood that one primary object of this invention is to provide a novel arrangement and combination of apparatus for spreading material across and in front of road-building machines.

A second object is to provide a spreader apparatus for road-building machines which can be used to transport large volumes of material from one side of the machine to another while simultaneously spreading the material over a subjacent prepared roadbed.

Another object of the invention is to provide a spreader means for use in combination with a road-building machine having a pair of side walls extending forwardly of the machine and a movable retainer gate disposed intermediate the side walls.

It is another object to provide a spreader car and distributing framework which may be moved transversely of the machine in a positive manner by a winch-operated cable.

Another object is to provide a spreader framework that is pivotally mounted on a horizontal axis from a spreader car and which may be operated by a fluid cylinder between raised and lowered positions as to captivate large quantities of material disposed in front of the machine.

A further object is to provide a spreader framework that is pivotally mounted on a horizontal axis from a spreader car and which may be operated by a fluid cylinder between raised and lowered positions, and further which is particularly adapted for use in spreading asphalt.

Other objects of this invention will become apparent in view of the following detailed description and the accompanying drawings.

Brief description of the drawings

In the drawings forming a part of this application and in which like parts are identified by like reference numerals throughout the same, FIG. 1 is a side elevation of a typical installation of the invention on a conventional slip-form paving machine for building concrete roads;

FIG. 2 is an enlarged plan view of the front portion of the machine shown in FIG. 1;

FIG. 3 is a section and elevation as viewed on lines 3—3 of FIG. 1;

FIG. 4 is an enlarged detail of the means for adjusting one end of the cable which positions the spreader car transversely of the machine;

FIG. 5 is a perspective view of the spreader car and pivoted framework, together with operating mechanism for effecting transverse movement of the car and pivotal movement of the framework;

FIG. 6 is a side elevation view of a typical installation wherein the slip-form paving machine and the spreader car and pivoted framework are adapted from the form shown in FIGS. 1–5 for spreading asphalt;

FIG. 7 is a compressed top view of the machine of FIG. 6.

Description of the preferred embodiments

Figure 8:
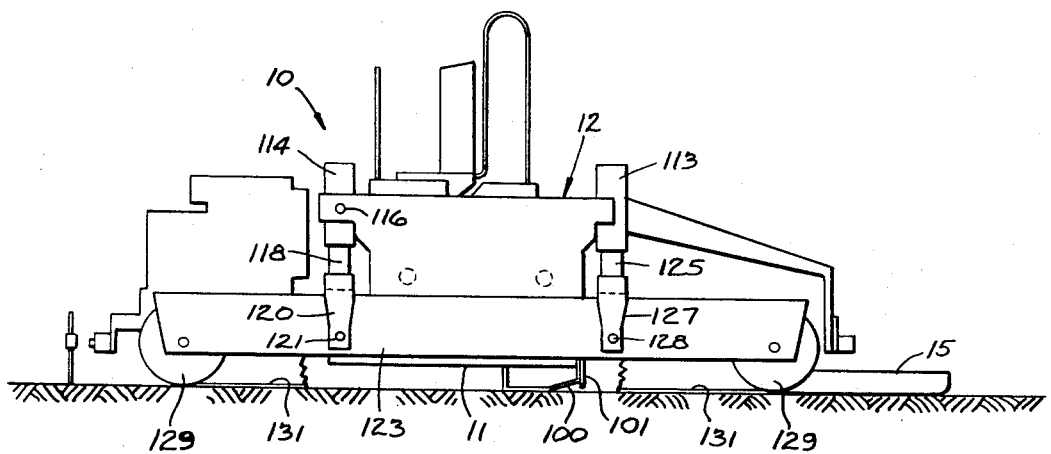
FIG. 8 is a side elevation view of the apparatus shown in FIG. 6.

Referring to FIG. 1 in particular, there is shown a slip-form paving machine 10 for use in spreading cementitious material. The machine comprises a main pan 11 and a supporting framework 12 having a control console 13. The machine, as a whole, is supported upon a pair of side tracks (not shown) which will advance the machine at relatively slow speeds along a prepared roadbed. The vertical position of framework 12 may be maintained or adjusted automatically relative to the side tracks by a grade control apparatus, such as disclosed in U.S. Patent No. 2,844,882.

The machine shown is also constructed with side retainer walls 14 and 15 which extend forwardly and are supported from framework 12 in parallel fashion in advance of pan 11. A movable retainer wall 16, supported upon ground-engaging shoes 17 and 18, is provided with a pair of hangers 19 and 20 which ride along and are guided by the upper rails of walls 14 and 15 (best shown in FIG. 2). Reference is hereby made to U.S. Patent No. 3,229,600 for further details of the structure of slidable wall 16. It will be evident that cementitious material C dumped directly upon the roadbed in front of pan 11, as from a dump truck T, will be confined by walls 14, 15 and 16. However, as the load height of material C retained behind wall 16 is increased, the forces acting against the wall 16 will move it forwardly in the direction of the machine's advancement, thereby enlarging the compartment defined by the walls. Where the material is freshly mixed concrete, it will tend to flow forwardly, reducing the height of the material confined. As machine 10 is advanced, it forms a continuous road slab, while the material retained in front of the machine is consumed and depleted. But additional material may be periodically dumped within the confines of walls 14, 15 and 16 so that a supply of material is always on hand and the machine may be continuously operated.

This invention is more particularly directed to the manner and means by which the confined cementitious material C (or asphalt material) is distributed transversely of the machine. For this purpose, there is provided an open-bottom box frame 25 having a side board 26 and essentially parallel spreader boards 27 and 28. Frame 25 is pivotally supported from a pair of depending arms 29 and 30, which are rigidly connected to the front side of a spreader car 31. The pivot axis 32 for frame 25 is located above and near the leading edge of pan 11, and a single hydraulic operating cylinder 33 is pivotally connected intermediate side board 26 and the forward side member of car 31. Although the supply lines for operating hydraulic cylinder 33 are not shown, it is to be understood that a conventional operating system is provided including suitable controls mounted to console 13. Therefore, selective operation of hydraulic cylinder 33 will pivot the open-bottom box frame 25 upon axis 32, positioning it in either the solid or broken line positions shown in FIG. 1.

Spreader car 31 is mounted upon a pair of support rails 34 and 35 for movement transverse of the machine. The forward wheels 36 are held upon rail 34 by an upper rail member 37, each of said wheels having peripheral flanges which are contacted and guided by associated rails. Rear wheels 38 of car 31 are held down on the upper surfaces of rail 35 by an upper rail 39. Rails 35 and 39 may be formed from a common channel member, as shown.

Car 31 is adapted for being moved transversely of machine 10 by a winch-operated cable 40 having several windings around a drum 41 driven by an electric motor 42. Cable 40 is entrained around pulleys 43 mounted to opposite sides of the machine, and the ends of said cable are anchored to the car by means for adjusting the cable tension, generally indicated by the reference number 44. Referring to FIG. 4 in particular, each anchorage and cable adjustment comprises an eye bolt 45, the threaded end of which extends through an opening in frame member 46 of car 31. The axis of bolt 45 is substantially coaxial with a spring guide or cup 47 that receives one end of a helical spring 48. The other end of spring 48 is disposed in a retainer cup 49 and the spring is placed in compression by threading a pair of nuts 50 onto the end of eye bolt 45. Tension is thereby applied to cable 40 with each end secured to car 31 in a positive yet yieldable fashion. It will be evident that springs 48 will provide a cushioning action to reduce the impact upon the cable and car as drum 41 begins turning.

In operation, box frame 25 and car 31 may be moved transversely of the machine to any area where there is a build-up of cementitious material. Moreover, frame 25 may be pivotally raised and lowered over that material by operation of the hydraulic cylinder 33. Then, while the framework is maintained in its lowermost position, spreader car 31 may again be moved transversely of the machine as to transport the confined material while simultaneously spreading the material over a subjacent roadbed.

Figure 9:
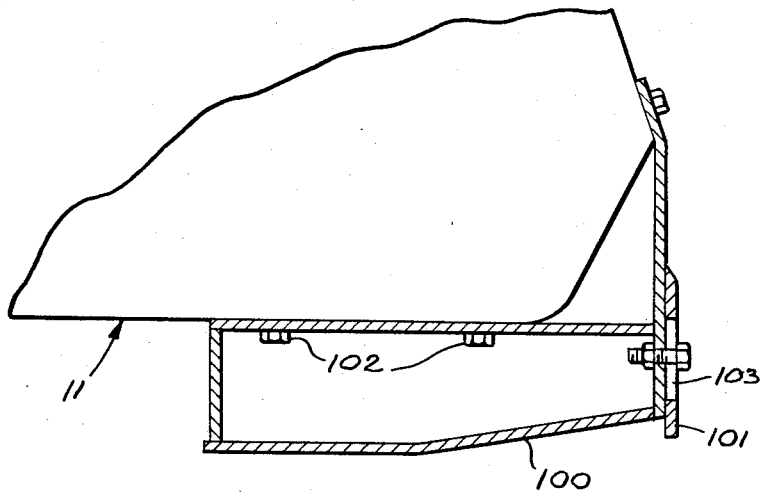
FIG. 9 is an enlarged detail sectional view of the auxiliary pan and strike-off blade of the machine illustrated in FIGS. 6 and 8.

If it is desired to employ the machine, and spreader car and frame in the spreading or distributing of asphalt, the machine 10 shown in FIGS. 1–5 is converted to the form shown in FIGS. 6 and 7. More particularly, and with reference to FIGS. 6, 7 and 9, an auxiliary pan 100 and strike-off blade 101 is fixed to the leading edge of the main pan 11 by bolts 102. With reference to FIG. 2, retainer wall 16, shoes 17 and 18, and hangers 19 and 20 are removed from association with side walls 14 and 15 (see FIG. 7). The headers such as those disclosed in the application entitled Adjustable Header Assembly for Road-Building Machinery, filed Aug. 10, 1962, Ser. No. 216,166, and now U.S. Patent No. 3,234,861, associated with wall 14 and 15 are changed to suit the depth of the asphalt slab desired. In addition, all reinforcing rod inserting equipment and vibrating equipment is removed, since it is not useful in the laying of an asphalt pavement.

Since the addition of the auxiliary pan 100 raises spreader car 31 and frame 25, and the thickness of the asphalt slab is generally less than the thickness of a concrete slab, frame 25 is provided with extensions 103 and 104 which depend from spreader boards 27 and 28, as best seen in FIGS. 6 and 7.

The operation of the converted machine of FIGS. 6 and 7 in spreading asphalt is obvious from an understanding of the operation of the machine of FIGS. 1–5 in spreading concrete material. There are, however, a few additional procedures which should be followed when using the apparatus on asphalt. More particularly, auxiliary pan 100 should be heated for starting or as otherwise desired to insure smooth compaction of the asphalt. In addition, the thickness of the asphalt slab may be adjusted or controlled, in operation, by adjusting the position or elevation of strike-off blade 101 and by varying the attitude of auxiliary pan 100.

The position of strike-off blade 101 may be changed by raising or lowering it with respect to auxiliary pan 100. For that purpose strike-off blade 101 is mounted to auxiliary pan 100 by means of a vertical slot connection 103 in association with bolts 102. Thus blade 101 may be raised and lowered to strike off an appropriate amount of asphalt and regulate the elevation of the loose asphalt immediately prior to engagement and compaction by auxiliary pan 100. The depth of the compacted slab may, accordingly, be adjusted and controlled.

The slab thickness or depth may also be controlled by varying the attitude of auxiliary pan 100. More specifically, auxiliary pan 100 may be rotated or pivoted about a horizontal axis perpendicular to the direction of travel of the machine to thereby alter its attitude. It should be noted that by so varying the attitude of auxiliary pan 100, the elevation of strike-off blade 101 is also varied, although its position relative to pan 100 does not vary. This variation in the attitude of auxiliary pan 100 is accomplished by tilting the machine 10 on its tracks. Thus, as the track elevation remains at the subgrade elevation (since it is supported on the subgrade), the machine 10 may be tilted with respect to the track and subgrade about a horizontal axis perpendicular to the direction of travel of machine 10. For that purpose, the frame 12 of the machine 10 is suspended at each corner thereof by hydraulic jacks 111, 112, 113, and 114. The rearmost jacks 111, 112 are connected to the frame 12 of pivots 115, 116 respectively, and the pistons 117, 118 (FIGS. 6 and 8) of these jacks are rigidly connected to yokes 119 and 120, which are in turn connected by pivots 121 to skirts 122, 123 respectively. The forwardmost jacks 113, 114 are rigidly connected to the frame 12, and the pistons 124, 125 of these jacks, respectively, are rigidly connected to yokes 126, 127, which are in turn connected by pivots 128 to skirts 122, 123 respectively. The skirts 122, 123 are supported by wheels 129 around which ground-engaging tracks 130, 131 on either side of machine 10 are passed. Alternatively, the yokes 119, 120, 126 and 127 may be pivotally connected to the wheels 131 by proper positioning of certain elements, or to other structures related to the tracks 130, 131. Although the supply lines for operating the hydraulic jacks are not shown, it is to be understood that a conventional operating system therefor is provided, including suitable controls mounted at console 13, for the individual control of the hydraulic jacks. The leading edge of the machine 10 may be raised or lowered relative to the tracks by actuating jacks 113, 114 in unison. Similarly, the tracking edge of machine 10 may be raised or lowered by means of the jacks 111, 112. By such an adjustment of machine 10 with respect to the tracks, the attitude of auxiliary pan 100 may be varied and in addition its elevation with respect to the subgrade may be varied. Accordingly, pan 100 may be caused to engage the loose asphalt at various attitudes to thereby control the thickness or depth of the slab formed by machine 10.

It will be understood that the main pan 11 may be filled to various degrees with ballast to vary the pressure applied to the asphalt by auxiliary pan 100. Moreover, it will be understood that the provision of auxiliary pan 100 with its smaller bearing surface (as compared to main pan 11) increases the pressure on the asphalt for a given ballast weight as compared to the pressure which would be transmitted by main pan 11.

Although a preferred embodiment of the invention has been shown and described, it is to be understood that various changes may be made without departing from the spirit of the invention or the scope of the attached claims, and each of such changes is contemplated.

I claim:
1. In combination with a road-building machine that travels along a roadbed, said machine having a paving pan, forward extending side retainer walls and a movable front retainer wall disposed intermediate the side walls, said front wall being slidably supported and guided by said side walls; a spreader car mounted upon said machine above said paving pan and movable in a direction transverse to said machine's travel, an open-bottom framework pivoted from said spreader car on a horizontal transverse axis near the leading edge of said pan; means for pivoting said framework between raised and lowered positions for selectively enclosing material confined between said pan and side and front retainer walls; and means for moving said spreader car transversely of said machine to transport and spread material confined in said framework.

2. In combination with a road-building machine that travels along a roadbed, said machine having a main pan, forward extending side retainer walls; a spreader car mounted upon said machine above said paving pan and movable in a direction transverse to said machine's travel, an auxiliary pan mounted to said main pan below the leading edge thereof, said auxiliary pan having a bearing surface area less than the bearing surface area of said main pan; an open-bottom framework pivoted from said spreader car on a horizontally transverse axis near the leading edge of said auxiliary pan; means for pivoting said framework between raised and lowered positions for selectively enclosing material confined between said auxiliary pan and said forward extending side retainer walls; and means for moving said spreader car transversely of said machine to transport and spread said material so confined.

3. The road-building machine of claim 2 and means for varying the elevation of said auxiliary pan relative to the subgrade.

4. The road-building machine of claim 2 and means for pivoting said auxiliary pan about a horizontal axis perpendicular to the direction of travel of said machine to thereby alter the attitude of said auxiliary pan.

5. The road-building machine of claim 2 and a strike-off blade mounted to the leading edge of said auxiliary pan, and means for adjusting the elevation of said strike-off blade relative to said auxiliary pan.

6. The road-building machine of claim 2 and a strike-off blade mounted to the leading edge of said auxiliary pan, means for pivoting said auxiliary pan about a horizontal axis perpendicular to be direction of travel of said machine to thereby alter the attitude of said auxiliary pan, and means for adjusting the elevation of said strike-off blade relative to said auxiliary pan.

7. In combination with a road-building machine that travels along a roadbed, a spreader car mounted upon said machine for movement in a direction transverse to the machine's travel, an open-bottom framework pivoted from said spreader car on a horizontal axis, said framework consisting of a front spreader blade spaced from said horizontal axis and extending transversely to the direction of travel of said machine and two spaced side spreader blades extending from said front spreader blade toward said horizontal axis in a direction parallel to said direction of travel, means for pivoting said framework between raised and lowered positions, and means for moving said spreader car transversely of said machine.

References Cited

UNITED STATES PATENTS

| | | | |
|---|---|---|---|
| 1,404,747 | 1/1922 | Faber | 94—44 |
| 2,184,906 | 12/1939 | Buhrmann | 94—47 |
| 2,951,692 | 9/1960 | Speno | 214—83.3 |
| 3,220,323 | 11/1965 | Lewis. | |

JACOB L. NACKENOFF, *Primary Examiner.*